2 Sheets—Sheet 1.

D. J. CASHMAN.
TRUCKS FOR HARVESTERS.

No. 188,001. Patented March 6, 1877.

Witnesses,
W. A. Cambridge
J. E. Cambridge

Inventor,
Dennis J. Cashman
Per Teschemacher & Stearns,
Attorneys.

N. PETERS, PHOTO-LITHOGRAPHER, WASHINGTON, D. C.

2 Sheets—Sheet 2.

D. J. CASHMAN.
TRUCKS FOR HARVESTERS.

No. 188,001. Patented March 6, 1877.

Witnesses,
W. J. Cambridge
J. E. Cambridge

Inventor,
Dennis J. Cashman,
Per Teschemacher & Stearns,
Attorneys.

N. PETERS, PHOTO-LITHOGRAPHER, WASHINGTON, D. C.

UNITED STATES PATENT OFFICE.

DENNIS J. CASHMAN, OF HANOVER, MASSACHUSETTS.

IMPROVEMENT IN TRUCKS FOR HARVESTERS.

Specification forming part of Letters Patent No. 188,001, dated March 6, 1877; application filed January 30, 1877.

*To all whom it may concern:*

Be it known that I, DENNIS J. CASHMAN, of Hanover, in the county of Plymouth and State of Massachusetts, have invented a Truck or Carriage for Conveying Mowing-Machines, Reapers, &c., from Place to Place, of which the following is a full, clear, and exact description, reference being had to the accompanying drawings, making part of this specification, in which—

Figure 1:
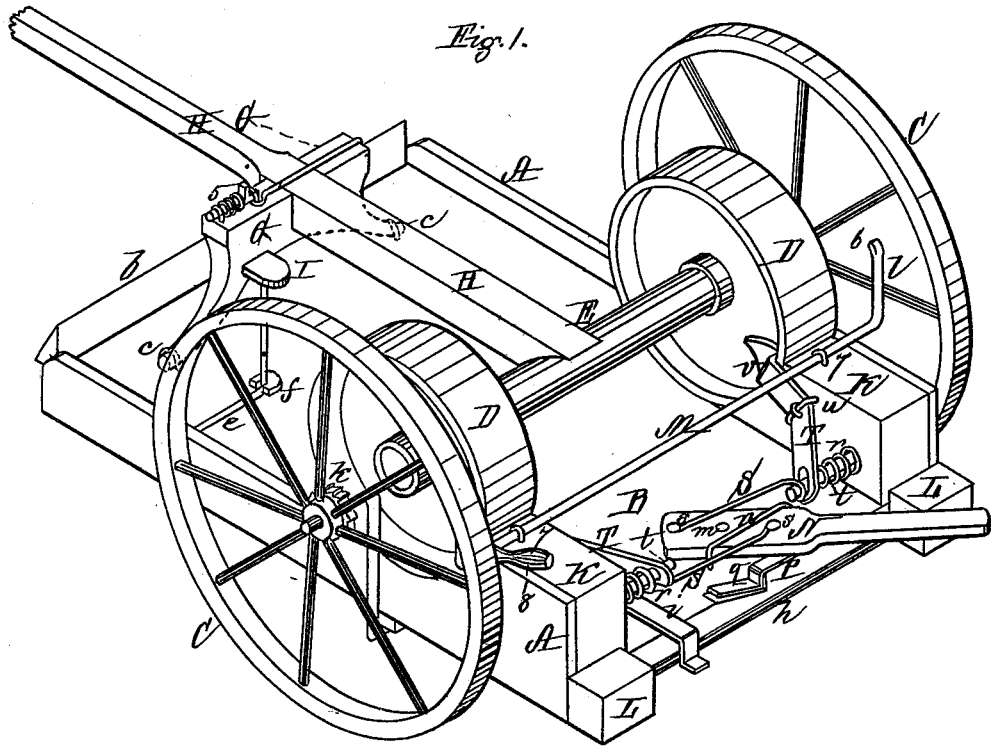
Figure 3:
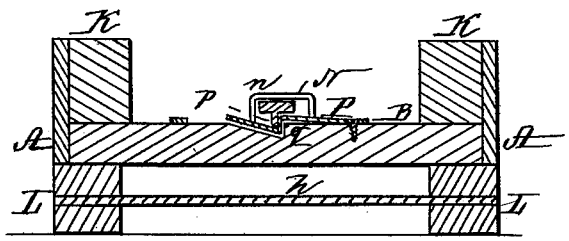
Figure 2:
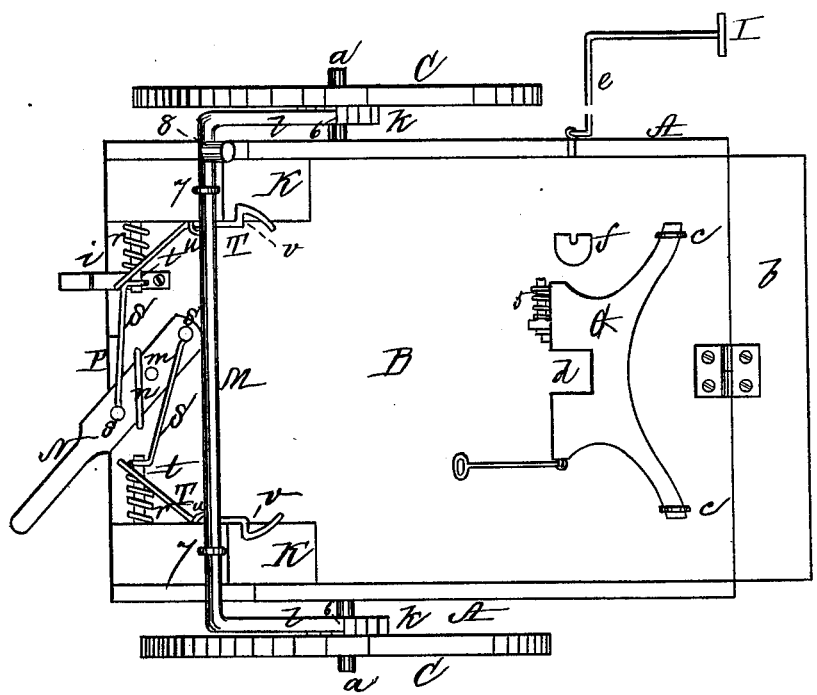

Figure 1 is a perspective view of the truck or carriage which I intend to employ for conveying mowing-machines, &c., to and from the field, a mowing-machine being in place thereon. Fig. 2 is a plan of the truck or carriage; Fig. 3, detail in section.

Heretofore it has been customary to place a mowing-machine within a cart or wagon, and transport it to the field where the work was to be performed; or, where the distance was short, the cart or wagon was dispensed with, and the horse or horses were attached directly to the machine, and it was drawn on the road. These methods of conveyance were objectionable, for the reason that where the cart or wagon was employed the placing of the machine thereon involved the labor of several men, and it became necessary to first attach the horse or horses to the cart, and, after having arrived at the field, to detach them therefrom and hitch them to the mowing-machine, and again repeat the changes when the work was done and the machine was to be returned to the barn; and when, to avoid this changing of horses, the machine was drawn over the road without placing it in a cart, the dirt in the road was taken up by the projections on the rims of the wheels, and was thrown against and into the bearings, which caused the parts soon to be worn away.

To remedy the above-mentioned objections is the purpose of my invention, which consists in a separate and independent truck or carriage of peculiar construction, upon which the mowing-machine is backed and carried to and from the field, the horse or horses being constantly attached to the draft-pole of the mowing-machine, which also serves as the draft-pole of the truck bearing the machine, by which construction the necessity of providing a separate pole for the truck, as well as the frequent changing of horses and the labor of lifting the machine into and out of a cart, as heretofore, are avoided.

To enable others skilled in the art to understand and use my invention, I will proceed to describe the manner in which I have carried it out.

In the said drawings, A represents a truck, consisting of a platform, B, and a pair of wheels, C C. The platform B is secured, at a point at the rear of its center, to an axle, $a$, which is bent down at right angles, so as to support the platform below a line passing through the center of the wheels C, this construction admitting of the front of the platform resting on the ground when not in use, in which position the surface of the platform forms an inclined plane rising from front to rear.

$b$ is a triangular strip, which is hinged to and extends across the front of the platform, and adapts itself to the ground, by which means the wheels D D of a mowing-machine, E, may be readily backed up the inclined surface of the platform, after which the strip $b$ may be swung up, as seen Fig. 1, in which position it serves as a ledge or rest, against which to place the ordinary tools used with a mowing-machine.

G is a pole-bridge, pivoted at $c\ c$ to the upper surface of the front of the platform, and provided with a rectangular recess, $d$, in its top, for the reception of the pole H of the mowing-machine, the pole being kept down in place by a rod pivoted to the top of the bridge G, and locked over the pole by means of a spring-catch, 5, the pole of the mowing-machine also serving as a draft-bar for the truck, thus dispensing with the necessity of a separate pole for the truck A. This bridge G may be instantly swung down, as seen in Fig. 2, to allow of the mowing-machine being backed up the inclined surface of the platform or to remove it therefrom. To one side of the platform, near its front, is pivoted the horizontal portion of a bent arm, $e$, which serves as a standard for supporting the seat I, a recessed cleat, $f$, being provided for the reception of the angular portion of the standard, whereby the seat is steadied and securely held in place when in use.

The position of this seat is in advance of the ordinary seat of the mowing machine, and is occupied by the driver in going to and from the field, and this seat may be instantly swung away to one side of the platform to allow of the mowing-machine being backed upon and removed from the platform.

The opposite corners of the rear of the platform are provided with blocks or cleats K, which serve as stops for the mowing-machine wheels to strike against and limit their backward motion, these wheels D D being kept in contact with their stops, and thus prevented from moving forward independently of the truck, by mechanism to be described hereafter.

Previous to backing the mowing-machine up the inclined surface of the platform A a pair of blocks, L, hinged to the under side of its rear, and coupled by a connecting-rod, $h$, are swung down into the position seen in Fig. 3, these blocks L resting on the ground, and thus preventing the overbalancing of the truck when the mowing-machine is backed into place thereon, the connecting-rod $h$ serving as a handle, by which these blocks may be swung up, as seen in Fig. 1, in which position they are locked by a spring, $i$, catching over the handle $h$ after the machine is in place.

Besides swinging the blocks L down upon the ground previous to backing the mowing-machine upon the truck, it is also necessary to lock the wheels of the truck to prevent their backward movement, which I accomplish by means of a brake of the following construction: Secured to the inside of each wheel C is a ratchet-wheel, $k$, and extending between and over the tops of the stop-blocks K is a long rod, M, the outer ends of which are bent at right angles thereto, forming short arms having their extremities bent down slightly at 6, these arms serving as pawls $l$, which engage with the ratchet-wheels $k$. This rod M is confined in place on the stop-blocks K by staples 7, which allow it to swing freely thereon, the brake being operated by the application of the hand to a short lever, 8, projecting up from one side of the same.

I will now describe the manner in which the mowing-machine wheels D D are locked in place and prevented from moving forward independently of the truck. At a point, $m$, in a line passing longitudinally through the center of the platform B, and at or near its rear, is pivoted a lever, N, which passes through a looped or bridge piece, $n$, and projects out horizontally beyond the end of the platform, the under side of the lever N being provided with a projection, $p$, which catches against a shoulder, $q$, formed on a spring-plate, P, secured to the upper side of the platform, the bridge-piece $n$ limiting the motion of the lever N when moved by the action of the springs $r$ $r$, (to be described.) S S are long rods, the inner ends of which are pivoted at $s$ $s$ to the lever N, the outer ends of these rods being provided with loops or eyes, so as to slide loosely over pins $t$, projecting out at right angles from the inner sides of the blocks or cleats K.

T T are bent levers, of the form shown, pivoted at $u$ to the inner sides of the blocks K, one end of each of these levers fitting loosely over one of the pins $t$, each pin being surrounded by a spiral spring, $r$, which is interposed between the end of the lever T and the block or cleat K.

The inner or short arm of each lever T is provided with a square shoulder, $v$, from which point the lever curves inwardly to its extremity, the square shoulders of these levers T being thrown out laterally by the expansion of the springs $r$ over the projecting rims formed on the inner sides of the wheels D D of the mowing-machine, thus locking its wheels, and securely holding it on the platform, as desired.

The springs $r$ are allowed to expand and throw out the short arms of the levers T into a position to catch over the rims of the mowing-machine wheels D D by liberating the projection $p$ on the under side of the lever N from the shoulder $q$, which is effected by depressing the end of the spring-plate P.

In backing the machine on the platform, when the wheels D D strike against the curved surface of the short arms of the levers T T, the parts being in the position seen in Fig. 2, these arms are thrown in to allow of the wheels passing back of the shoulders $v$ $v$, and the long or outer arms of the levers are simultaneously carried toward the blocks K, thus compressing the springs $r$ between them, and after the rims of the wheels D D have passed to the rear of the shoulders $v$ $v$, the springs $r$, in returning to their normal position, cause the shoulders $v$ $v$ to be thrown out, and the wheels are thus locked and the machine held securely in place on the platform, as desired.

It is evident that one of the blocks L may be dispensed with, in which case the remaining block should be pivoted at or near the center of the rear of the truck, thereby avoiding any shock and consequent racking of the parts which might otherwise occur; and it is also evident that my independent truck may be employed in the transportation of reapers and various other machines, if required.

What I claim as my invention, and desire to secure by Letters Patent, is—

1. An independent truck or carriage, A, for conveying a mowing-machine, &c., from place to place, said truck consisting of a low platform, B, hung on an axle, $a$, provided with a pair of wheels, C C, and with suitable devices for locking the wheels of the mowing-machine, &c., in place thereon, said platform having no draft-pole, but having a bridge, G, or other device for connecting the front of the platform with the pole of the mowing-machine, &c., substantially as and for the purpose described.

2. The device for locking and unlocking the wheels of the mowing-machine, consisting of the levers T T, with their shoulders $v$ $v$, oper ated by the springs $r\ r$, rods S S, and lever N, substantially as set forth.

3. The spring-plate P, with its shoulder $q$, and the lever N, with its projection $p$, in combination with the rods S S, springs $r\ r$, and levers T T, with their shoulders $v\ v$, substantially as and for the purpose specified.

4. The pivoted pole-bridge G, in combination with the pole H and truck A, substantially as described, for the purpose set forth.

5. The seat I, with its bent arm or standard $e$ pivoted to the platform B, or device attached thereto, in combination with a recessed cleat, $f$, or other means of supporting the standard $e$, substantially as described.

Witness my hand this 25th day of January, 1877.

DENNIS J. CASHMAN.

In presence of—
N. W. STEARNS,
W. J. CAMBRIDGE.